United States Patent [19]

Higdon et al.

[11] 3,812,210

[45] May 21, 1974

[54] VAPOR PHASE DECOMPOSITION OF METHYL FORMATE TO YIELD METHANOL

[75] Inventors: Buster W. Higdon, Gray; Charles C. Hobbs; Michael J. Onore, both of Corpus Christi, all of Tex.

[73] Assignee: Celanese Corporation, New York, N.Y.

[22] Filed: Aug. 13, 1971

[21] Appl. No.: 171,718

[52] U.S. Cl. ......... 260/638 R, 252/372, 260/614 R, 260/643 F, 423/415
[51] Int. Cl. .................... C07c 27/00, C07c 29/00
[58] Field of Search ........ 260/638 R, 638 A, 643 F; 423/415

[56] References Cited
UNITED STATES PATENTS

| | | | |
|---|---|---|---|
| 3,334,149 | 8/1967 | Akin et al. | 260/638 A |
| 3,384,659 | 5/1968 | Bate | 260/643 F |
| 2,511,467 | 6/1950 | Gresham | 260/638 R |
| 3,462,500 | 8/1969 | Tummes et al. | 260/643 F |
| 2,860,170 | 11/1958 | Criscione et al. | 260/638 R |
| 1,302,011 | 4/1919 | Christiansen | 260/638 A |

FOREIGN PATENTS OR APPLICATIONS

| | | | |
|---|---|---|---|
| 369,574 | 2/1923 | Germany | 260/638 A |
| 274,785 | 9/1964 | Australia | 260/631 B |

*Primary Examiner*—Joseph E. Evans
*Attorney, Agent, or Firm*—Thomas J. Morgan; Marvin Turken; Ralph M. Pritchett

[57] ABSTRACT

An improved process is provided for the thermocatalytic decomposition of methyl formate to yield methanol and carbon monoxide as the major decomposition products. Methyl formate while in the gaseous phase and at a temperature of about 200° to 500°C. (preferably 250° to 400°C.) is contacted with a solid catalyst (described in detail herein) capable of promoting the desired decomposition reaction. In a preferred embodiment of the process a gaseous stream of methyl formate is continuously passed through a fixed bed of the catalyst while at the temperature indicated.

5 Claims, No Drawings

VAPOR PHASE DECOMPOSITION OF METHYL FORMATE TO YIELD METHANOL

BACKGROUND OF THE INVENTION

Those operating in the chemical process industry are sometimes found to possess excessive quantities of methyl formate for which an end use or market may not be readily available. For instance, methyl formate may be formed as a recoverable by-product during the production and/or purification of other chemicals.

In commonly assigned U. S. Ser. No. 863,166, filed Oct. 2, 1969 and now U. S. Pat. No. 3,660,483, of Charles C. Hobbs and John A. Bedford is disclosed a process wherein formic acid is removed from a crude liquid comprising predominantly acetic acid and formic acid by passing the liquid while at an elevated temperature downwardly through a stripping column within which the liquid is contacted countercurrently with an upwardly flowing vapor comprising a lower alkanol, such as methanol. The formic acid contaminant reacts with the methanol to form methyl formate which is removed as vapor from the head of the column. From the base of the column is withdrawn purified acetic acid possessing a lower formic acid content.

Processes have been proposed in the past for the production of other chemicals such as methanol from methyl formate. See, for instance, U. S. Pat. No. 1,302,011 to Christiansen wherein hydrogen is reacted with methyl formate in the presence of copper at 180°C. to form methanol.

It is an object of the invention to provide an improved process for converting methyl formate into methanol and carbon monoxide.

It is an object of the invention to provide an improved process for the thermocatalytic decomposition of methyl formate to yield methanol and carbon monoxide as the major decomposition products.

It is another object of the invention to provide an improved process for the vapor phase decomposition of methyl formate to yield methanol.

It is a further object of the invention to provide a process for the removal of undesired methyl formate from a gaseous stream through the conversion of the same to non-condensable gases.

These and other objects, as well as the scope, nature, and utilization of the invention will be apparent from the following detailed description and appended claims.

SUMMARY OF THE INVENTION

It has been found that a thermocatalytic process for the production of methanol comprises contacting methyl formate while in the gaseous phase and at a temperature of about 200° to 500°C. with a solid catalyst capable of promoting the decomposition of the methyl formate to form a gaseous mixture containing methanol and carbon monoxide as the major decomposition products, with the catalyst being selected from the group consisting of an alkaline earth metal oxide, an alkaline earth metal halide, an alkaline earth metal hydroxide, a free transition metal, a transition metal oxide, zinc oxide, aluminum oxide, a hydrated aluminum silicate, and mixtures of the foregoing.

The particularly preferred solid catalysts for use in the process are the oxides of alkaline earth metals, such as calcium oxide and barium oxide. The optimum temperature for carrying out the catalyzed decomposition reaction is generally about 350°C.

Description of the Preferred Embodiments

Methyl formate while in the gaseous state and at a temperature of about 200° to 500°C. is subjected to a thermocatalytic decomposition reaction to yield methanol and carbon monoxide as the major decomposition products. The gaseous methyl formate is preferably provided at a temperature of about 250° to 400°C., and most preferably at a temperature of about 325° to 375°C. (e.g., 350°C.). It is, of course, essential that the temperature be below the melting point or decomposition point of the specific catalyst utilized.

The pressure at which the gaseous methyl formate is provided during the decomposition reaction may be varied. For instance, pressures ranging from about atmospheric pressure up to about 500 psig may be selected. Superatmospheric pressures facilitate a more efficient controlled transfer of the gaseous methyl formate.

In a preferred embodiment of the process the solid catalyst is provide as a fixed vapor permeable bed through which a gaseous stream of methyl formate is continuously passed. Suitable apparatus wherein the fixed catalyst bed may be positioned include metal tubing of a sufficiently high pressure rating which is heated either electrically or by contact with a heat exchange medium. Precautions should be taken to exclude excessive quantities of free oxygen from the apparatus so that explosion hazards are minimized as will be apparent to those skilled in the art.

The preferred catalyst for use in the process of the invention is an oxide of an alkaline earth metal. The particularly preferred alkaline earth metal oxides are calcium oxide [CaO] and barium oxide [BaO]. Magnesium [MgO] and strontium oxide [SrO] may also be selected.

Suitable alkaline earth metal halide catalysts include magnesium chloride, calcium chloride, strontium chloride, barium chloride, magnesium fluoride, calcium fluoride, strontium fluoride, barium fluoride, magnesium bromide, calcium bromide, strontium bromide, barium bromide, magnesium iodide, calcium iodide, strontium iodide, and barium iodide.

The preferred alkaline earth metal halide catalyst for use in the process is barium chloride. At least a portion of the alkaline earth metal halides may be converted to the corresponding oxides during the thermocatalytic process of the present invention.

Suitable alkaline earth metal hydroxide catalysts include magnesium hydroxide [$Mg(OH)_2$], calcium hydroxide [$Ca(OH)_2$], strontium hydroxide [$Sr(OH)_2$], and barium hydroxide [$Ba(OH)_2$].

Suitable free transition metal catalysts include nickel, tungsten, cobalt, iron, molybdenum, chromium, etc. The preferred free transition metal catalysts for use in the process are nickel and tungsten.

Suitable transition metal oxide catalysts for use in the process include chromic oxide [$Cr_2O_3$], molybdenum trioxide [$MoO_3$], ferric oxide [$Fe_2O_3$], cobalt oxide [$Co_2O_3$], nickel oxide [$Ni_2O_3$], tungsten trioxide [$WO_3$], etc. The preferred transition metal oxide catalysts for use in the process are chromic oxide and molybdenum trioxide.

Additionally, suitable catalysts for use in the process include zinc oxide [$ZnO$], aluminum oxide [$(Al)_2O_3$], and the hydrated aluminum silicates. The hydrated aluminum silicates contemplated for use as catalysts in the process are commonly termed molecular sieves or zeolites and may include either sodium or calcium, or both, e.g., $Na_2O \cdot Al_2O_3 \cdot nSiO_2 \cdot xH_2O$. The hydrated aluminum silicates may be either naturally occurring or synthetically prepared. The preferred hydrated aluminum silicate catalysts for use in the process have sodalite cages or beta-cages in a diamond type latice. The sodium ion may be replaced in whole or in part by other ions such as lithium, potassium, rubidium, cesium, calcium, strontium, barium, copper, cobalt, and nickel.

The foregoing catalysts may be provided either alone or in combination when carrying out the present process. Additionally, the active contact surface of the solid catalyst may be provided upon a carrier which is capable of withstanding the temperatures employed in the thermocatalytic decomposition reaction. Suitable carriers include diatomaceous earth (kieselguhr, etc.), pumice, porcelain, silica gel, asbestos, alumina, carbon (e.g., charcoal), glass, quartz, kaoline, silicates, infusorial earth, magnesium and barium sulfates, zeolites, magnesias, and bauxite. If desired, carriers may be selected which inherently possess catalytic activity for the desired decomposition reaction, e.g., alumina, zeolites (e.g., sodalite), and bauxite, etc. A carrier is particularly useful in maintaining the active contact surface at a fixed location particularly when a stream of gaseous methyl formate is passing therethrough.

The solid catalyst is preferably provided in a particulate form so that an active contact surface of relatively large surface area is presented for contact with the methyl formate vapor undergoing decomposition. Accordingly catalyst particulate sizes commonly range from about 1/16 to 4/16 inch and preferably 2/16 to 3/16 inch. It has been found that a relatively small quantity of solid catalyst is capable of bringing about the decomposition of a relatively large volume of methyl formate.

The resulting methanol and carbon monoxide decomposition products may be substantially separated following contact with the solid catalyst by subjecting the gaseous mixture of the same to a cooling treatment wherein the gaseous mixture is cooled to a temperature below the boiling point of methanol (e.g., about $-20°$ to $+40°C$. at atmospheric pressure), and the methanol component of the mixture is converted to the liquid phase while the carbon monoxide component remains in the gaseous phase.

The process of the present invention is particularly suitable for use in conjunction with the process of U. S. Ser. No. 863,166, filed Oct. 2, 1969. For instance, gaseous methyl formate may pass directly from the esterification column to a suitable decomposition reactor. The effluent from the thermocatalytic decomposition of the present process may be recycled to the esterification column, requiring only a small makeup of methanol.

The following examples are given as specific illustrations of the invention. It should be understood, however, that the invention is not limited to the specific details set forth in the examples.

In Examples I through IX the thermocatalytic decomposition of methyl formate was conducted in a tubular reaction zone provided with a variety of solid particulate catalysts in accordance with the process of the present invention. The reaction zone comprised a horizontal quartz tube of 1.5 cm. diameter in which was provided about 60 grams of a solid catalyst in a fixed bed having a length of about 30 cm. The particulate catalyst was secured within the tube by means of glass wool, and occupied a volume of about 53 ml. The reaction zone was suspended within a Thomas high temperature combustion furnace, and was maintained at a constant temperature of about 350°C. and at atmospheric pressure. The vapor while passing through the reaction zone assumed a substantially identical temperature as the solid catalyst present within the reaction zone.

Nitrogen served as an inert carrier gas for the gaseous methyl formate which was passed through the reaction zone. A stream of nitrogen at a rate of 10 ml. per minute was initially bubbled through a vessel of mineral oil for the purpose of confirming by visual observation the nitrogen flow, and then passed to a vessel containing liquid methyl formate provided at room temperature (i.e., about 25°C.) where it was bubbled through the same. The gaseous stream exiting from the vessel contained about 91 percent by volume methyl formate and 9 percent by volume nitrogen, and was immediately passed through the reaction zone.

The gaseous product stream exiting from the reaction zone was passed to a dry ice-acetone condensor wherein it was cooled to a temperature of less than 0°C. The resulting liquid and gaseous phases were separately collected and analyzed.

EXAMPLE I

The particulate catalyst provided in the reaction zone consisted of 27 percent by weight barium chloride [$BaCl_2$] provided upon a carbon support. The particle size of the catalyst was approximately 5/32 inch. The catalyst was commercially available from the Harshaw Chemical Company under the designation of "Ba-0108E" catalyst.

The analysis of the resulting liquid and gaseous phases expressed in weight per cent for the liquids and by volume percent for the gases was as follows:

| Liquid Phase | | Gaseous Phase | |
|---|---|---|---|
| Water | 0.8 | Carbon monoxide | 69.7 |
| Methyl formate | 57.0 | Nitrogen | 9.8 |
| Methanol | 41.8 | Methane | 5.3 |
| Dimethyl ether | 0.4 | Water | 0.3 |
| Total accountability | 100.0 | Methanol | — |
| | | Oxygen | 1.1 |
| | | Carbon dioxide | 11.8 |
| | | Methyl formate | — |
| | | Hydrogen | — |
| | | Total accountability | 98.0 |

EXAMPLE II

The particulate catalyst provided in the reaction zone consisted of aluminum oxide [$(Al)_2O_3$]. The particle size of the catalyst was approximately 3/16 inch.

The analysis of the resulting liquid and gaseous phases expressed in weight percent for the liquid and volume percent for the gases was as follows:

| Liquid Phase | | Gaseous Phase | |
|---|---|---|---|
| Water | 19.4 | Carbon monoxide | 79.2 |
| Methyl formate | 15.8 | Nitrogen | 6.3 |
| Methanol | 54.7 | Methane | 7.7 |
| Dimethyl ether | 10.2 | Water | 0.5 |
| Total accountability | 100.1 | Methanol | — |
| | | Oxygen | 2.7 |
| | | Carbon dioxide | 1.9 |
| | | Methyl formate | — |
| | | Hydrogen | — |
| | | Total accountability | 98.3 |

EXAMPLE III

The particulate catalyst provided in the reaction zone consisted of 10 percent weight calcium oxide [CaO] provided on an aluminum oxide [$(Al)_2O_3$] support. The catalyst was prepared by tumbling the aluminum oxide support with moist calcium oxide powder, and subsequently heating the same under mild conditions to drive off the water. The particle size of the catalyst was approximately 3/16 inch.

The analysis of the resulting liquid and gaseous phases expressed in weight percent for the liquids and volume percent for the gases was as follows:

| Liquid Phase | | Gaseous Phase | |
|---|---|---|---|
| Water | 7.9 | Carbon monoxide | 82.4 |
| Methyl formate | 44.3 | Nitrogen | 7.3 |
| Methanol | 41.9 | Methane | 1.3 |
| Dimethyl ether | 6.0 | Water | 0.7 |
| Total accountability | 100.1 | Methanol | — |
| | | Oxygen | 0.6 |
| | | Carbon dioxide | 4.6 |
| | | Methyl formate | — |
| | | Hydrogen | — |
| | | Total accountability | 96.9 |

EXAMPLE IV

The particulate catalyst provided in the reaction zone consisted of 10 percent by weight barium oxide [BaO] provided on an aluminum oxide [$(Al)_2O_3$] support. The catalyst was prepared by tumbling the aluminum oxide support with moist barium oxide powder, and subsequently heating the same under mild conditions to drive off the water. The particle size of the catalyst was approximately 3/16 inch.

The analysis of the resulting liquid and gaseous phases expressed in weight percent for the liquids and volume percent for the gases was as follows:

| Liquid Phase | | Gaseous Phase | |
|---|---|---|---|
| Water | 0.9 | Carbon monoxide | 90.4 |
| Methyl formate | 40.0 | Nitrogen | 6.7 |
| Methanol | 57.2 | Methane | 0.3 |
| Dimethyl ether | 2.0 | Water | 0.2 |
| Total accountability | 100.1 | Methanol | 0.2 |
| | | Oxygen | — |
| | | Carbon dioxide | 1.1 |
| | | Methyl formate | 0.3 |
| | | Hydrogen | — |
| Total accountability | | | 99.2 |

EXAMPLE V

The particulate catalyst provided in the reaction zone consisted of 10 percent by weight strontium hydroxide [$Sr(OH)_2$] provided upon a aluminum oxide [$(Al)_2O_3$] support. The catalyst was prepared by tumbling the aluminum oxide support with moist strontium hydroxide powder, and subsequently heating the same under mild conditions to drive off the water. The particle size of the catalyst was approximately 3/16 inch.

The analysis of the resulting liquid and gaseous phases expressed in weight per cent for the liquids and in volume percent for the gases was as follows:

| Liquid Phase | | Gaseous Phase | |
|---|---|---|---|
| Water | 0.8 | Carbon monoxide | 75.9 |
| Methyl formate | 47.4 | Nitrogen | 17.2 |
| Methanol | 49.2 | Methane | 0.2 |
| Dimethyl ether | 2.7 | Water | 0.2 |
| Total accountability | 100.1 | Methanol | 0.2 |
| | | Oxygen | 3.4 |
| | | Carbon dioxide | 1.9 |
| | | Methyl formate | 0.3 |
| | | Hydrogen | — |
| | | Total accountability | 99.3 |

EXAMPLE VI

The particulate catalyst provided in the reaction zone consisted of 24 percent by weight zinc oxide [ZnO] provided upon an alumina [$(Al)_2O_3$] support. The particle size of the catalyst was approximately 5/32 inch. The catalyst was commercially available from the Harshaw Chemical Company under the designation "Zn-0701T" catalyst.

The analysis of the resulting liquid and gaseous phases expressed in weight percent for the liquids and in volume percent for the gases was as follows:

| Liquid Phase | | Gaseous Phase | |
|---|---|---|---|
| Water | 0.4 | Carbon monoxide | 85.9 |
| Methyl formate | 43.7 | Nitrogen | 4.5 |
| Methanol | 52.3 | Methane | 0.7 |
| Dimethyl ether | 3.6 | Water | — |
| Total accountability | 100.0 | Methanol | 0.5 |
| | | Oxygen | — |
| | | Carbon dioxide | 6.2 |
| | | Methyl formate | 0.7 |
| | | Hydrogen | — |
| | | Total accountability | 98.5 |

EXAMPLE VII

The particulate catalyst provided in the reaction zone consisted of 10 percent by weight zinc oxide [ZnO] and 10 percent by weight chromic oxide [$Cr_2O_3$] provided upon an alumina [$(Al)_2O_3$] support. The particle size of the catalyst was approximately 5/32 inch. The catalyst was commercially available from the Harshaw Chemical Company under the designation "Zn-0602T" catalyst.

The analysis of the resulting liquid and gaseous phases expressed in weight percent for the liquids and in volume percent for the gases was as follows:

| Liquid Phase | | Gaseous Phase | |
|---|---|---|---|
| Water | 1.5 | Carbon monoxide | 72.3 |
| Methyl formate | 34.1 | Nitrogen | 3.3 |
| Methanol | 50.4 | Methane | 1.4 |
| Dimethyl ether | 14.0 | Water | — |
| Total accountability | 100.0 | Methanol | 0.9 |
| | | Oxygen | — |
| | | Carbon dioxide | 19.0 |
| | | Methyl formate | 0.3 |
| | | Hydrogen | — |
| | | Total accountability | 97.2 |

EXAMPLE VIII

The particulate catalyst provided in the reaction zone consisted of 10 percent by weight molybdenum trioxide [$MoO_3$] provided upon an alumina [$(Al)_2O_3$] support. The particle size of the catalyst was approximately 5/32 inch. The catalyst was commercially available from the Harshaw Chemical Company under the designation "Mo-1202T" catalyst.

The analysis of the resulting liquid and gaseous phases expressed in weight percent for the liquids and volume percent for the gases was as follows:

| Liquid Phase | | Gaseous Phase | |
|---|---|---|---|
| Water | 25.1 | Carbon monoxide | 71.1 |
| Methyl formate | 24.1 | Nitrogen | 8.2 |
| Methanol | 40.0 | Methane | 9.2 |
| Dimethyl ether | 10.8 | Water | 0.2 |
| Total accountability | 100.0 | Methanol | 0.5 |
| | | Oxygen | 1.1 |
| | | Carbon dioxide | 6.1 |
| | | Methyl formate | 0.2 |
| | | Hydrogen | — |
| | | Total accountability | 96.6 |

EXAMPLE IX

The particulate catalyst provided in the reaction zone consisted of 6 percent by weight free nickel and 19 percent by weight free tungsten provided upon an alumina ](Al)$_2$O$_3$] support. The particle size of the catalyst was approximately 5/32 inch. The catalyst was commercially available from the Harshaw Chemical Company under the designation "Ni-4303T" catalyst.

The analysis of the resulting liquid and gaseous phases expressed in weight percent for the liquids and volume percent for the gases was as follows:

| Liquid Phase | | Gaseous Phase | |
|---|---|---|---|
| Water | 17.4 | Carbon monoxide | 81.2 |
| Methyl formate | 29.7 | Nitrogen | 6.1 |
| Methanol | 39.3 | Methane | 2.5 |
| Dimethyl ether | 13.7 | Water | 0.4 |
| Total accountability | 100.1 | Methanol | 0.8 |
| | | Oxygen | — |
| | | Carbon dioxide | 4.4 |
| | | Methyl formate | 0.2 |
| | | Hydrogen | — |
| | | Total accountability | 95.6 |

EXAMPLE X

Example I was repeated with the exception that no inert carrier gas was utilized. The methyl formate was caused to flow through the reaction zone by vaporizing the same through the use of a heating mantle.

The analysis of the resulting liquid and gaseous phases expressed in weight percent for the liquids and volume percent for the gases was as follows:

| Liquid Phase | | Gaseous Phase | |
|---|---|---|---|
| Water | 0.8 | Carbon monoxide | 79.3 |
| Methyl formate | 52.6 | Nitrogen | 2.7 |
| Methanol | 46.3 | Methane | 3.9 |
| Dimethyl ether | 0.3 | Water | 0.4 |
| Total accountability | 100.0 | Methanol | 2.0 |
| | | Oxygen | 0.7 |
| | | Carbon dioxide | 9.8 |
| | | Methyl formate | 0.6 |
| | | Hydrogen | 4.9 |
| | | Total accountability | 104.3 |

It will be noted in the foregoing examples that the pattern of minor decomposition products varies with the exact catalyst selected.

EXAMPLE XI

To further illustrate the process of the invention the thermocatalytic decomposition of a feed mixture rich in methyl formate was conducted by the continuous passage of the same while in vapor form through a catalyst bed provided with a particulate faujasite zeolite having a particle size of approximately 1/16 × ⅛ inch. The catalyst was commercially available from the Union Carbide Corporation under the designation "Linde 13X" molecular sieve.

The reaction zone comprised a vertical 2 foot tube of 2 inch diameter in which was provided about 475 grams of the catalyst over a length of 20 inches. The particulate catalyst was secured within the tube by means of 20 mesh stainless steel screen (316 SS), and occupied a volume of about 64 inch³. A stainless steel vaporizer (316 SS) containing the feed was positioned at the bottom of the catalyst bed and was maintained at 78°C. The bottom of the bed was maintained at 150°C., the middle of the bed at 250°C., and the top of the bed at 270°C. The vapor passing through the reaction zone assumed a substantially identical temperature as the solid catalyst present within the reaction zone. The contents of the reaction zone were maintained under a constant pressure of 40 psig.

The gaseous stream exiting from the reaction zone was passed through a six foot coil of 0.25 inch stainless steel tubing maintained at about 32°C.

An analysis of the feed mixture expressed in weight percent was as follows:

| | |
|---|---|
| Water | 0.5 |
| Methylal | 5.4 |
| Methyl acetate | 3.6 |
| Methyl formate | 71.3 |
| Methyl iso-butyl ether | 3.9 |
| Dimethyl ketone | 0.9 |
| Ethyl formate | 10.2 |
| Acetaldehyde | 2.6 |
| Methanol | 1.6 |
| Total accountability | 100.0 |

The analysis of the resulting liquid and gaseous phases expressed in weight percent for the liquids and volume percent for the gases was as follows:

| | Liquid Phase | Gaseous Phase |
|---|---|---|
| Water | 5.5 | — |
| Methyl formate | 28.7 | 5.9 |
| Methyl iso-butyl ether | 0.8 | 0.1 |
| iso-Butylene | 0.4 | 1.4 |
| Dimethyl ether | 10.4 | 11.3 |
| Acetaldehyde | 1.8 | 2.0 |
| Carbon dioxide | — | 10.1 |
| Carbon monoxide | — | 69.2 |
| Methylal | 0.4 | — |
| Methyl acetate | 6.7 | — |
| Ethyl formate | 2.5 | — |
| Mythyl alcohol | 42.9 | — |
| Total accountability | 100.1 | 100.0 |

As will be apparent to those skilled in the art, variations and modifications of the foregoing examples may be resorted to without departing from the basic concept of the present invention. Such variations and modifications are to be considered within the purview and scope of the claims appended hereto.

We claim:

1. A thermocatalytic process for producing methanol, which process comprises contacting methyl formate, in the gaseous phase and at a temperature of about 200° to 500°C, with a solid catalyst consisting essentially of an alkaline earth metal oxide to form a gaseous mixture containing methyl formate decomposition products comprising predominantly methanol and carbon monoxide.

2. The process of claim 1 wherein the alkaline earth oxide is a member of the group consisting of calcium oxide and barium oxide.

3. The process of claim 2 wherein the alkaline earth oxide is barium oxide.

4. A thermocatalytic process for the production of methanol comprising contacting methyl formate while in the gaseous phase at a pressure from about atmospheric up to about 500 psig and at a temperature of about 250° to 400°C. with solid barium oxide by continuous passage through a fixed bed of particulate solids consisting essentially of said barium oxide to form a gaseous mixture containing methanol and carbon monoxide as the major decomposition products, and substantially separating said methanol from said carbon monoxide by subjecting said gaseous mixture to a cooling treatment wherein said gaseous mixture is cooled to a temperature below the boiling point of methanol and the methanol component thereof is converted to the liquid phase while the carbon monoxide component thereof remains in the gaseous phase.

5. A process according to claim 4 wherein said solid barium oxide is present upon an aluminum oxide support.

* * * * *